United States Patent
Kellner

(10) Patent No.: US 12,455,165 B2
(45) Date of Patent: Oct. 28, 2025

(54) METHOD FOR DETECTING OBJECTS IN THE SURROUNDINGS OF A VEHICLE BY DETERMINING COVERAGE OF THE OBJECTS, COMPUTING DEVICE, AND SENSOR SYSTEM

(71) Applicant: Bayerische Motoren Werke Aktiengesellschaft, Munich (DE)

(72) Inventor: Dominik Kellner, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 288 days.

(21) Appl. No.: 18/277,805

(22) PCT Filed: Feb. 17, 2022

(86) PCT No.: PCT/EP2022/053993
§ 371 (c)(1),
(2) Date: Aug. 18, 2023

(87) PCT Pub. No.: WO2022/175405
PCT Pub. Date: Aug. 25, 2022

(65) Prior Publication Data
US 2024/0044649 A1  Feb. 8, 2024

(30) Foreign Application Priority Data
Feb. 19, 2021  (DE) ...................... 10 2021 104 015.9

(51) Int. Cl.
*G01C 21/00*  (2006.01)
(52) U.S. Cl.
CPC .................... *G01C 21/005* (2013.01)
(58) Field of Classification Search
CPC ...... G01C 23/00; G01C 21/166; G01C 21/30; G01C 23/005; G01C 21/20; G01C 21/26;
(Continued)

(56) References Cited

U.S. PATENT DOCUMENTS 9,230,442 B2 * 1/2016 Bowers .................. G08G 1/164
11,461,915 B2 * 10/2022 Unnikrishnan ........ G06V 20/58
(Continued)

FOREIGN PATENT DOCUMENTS

DE   101 48 064 A1   4/2003
DE   101 48 068 A1   4/2006
(Continued)

OTHER PUBLICATIONS

International Search Report (PCT/ISA/210) issued in PCT Application No. PCT/EP2022/053993 dated Jun. 3, 2022 with English translation (4 pages).
(Continued)

*Primary Examiner* — Andre J Allen
(74) *Attorney, Agent, or Firm* — Crowell & Moring LLP

(57) ABSTRACT

A method for detecting objects in the surroundings of a vehicle includes receiving sensor data which describe the objects in the surroundings from a surroundings sensor of the vehicle; determining each of the corners of the objects, with the corners describing outer delimitations of each object; determining a relative position of each of the corners to the surroundings sensor; sorting the determined corners in a predetermined angle direction; checking, for each of the corners in the angle direction, whether the corners are covered by another of the objects, on the basis of the relative position of each of the corners to the surroundings sensor; and determining regions of each of the objects that can be detected by the surroundings sensor, on the basis of checking the corners.

9 Claims, 5 Drawing Sheets

(58) Field of Classification Search
CPC ...... G01C 21/16; G01C 21/22; G01C 21/188; G01C 5/005; G01C 21/28; G01C 21/18; G01C 21/203; G01C 19/42; G01C 21/367; G01C 19/32; G01C 21/165; G01C 19/44; G01C 21/12; G01C 25/00; G01C 21/14; G01C 5/06; G01C 17/38; G01C 17/30; G01C 21/183; G01C 25/005; G01C 21/3632; G01C 21/185; G01C 21/3629; G01C 21/3667; G01C 19/00; G01C 19/38; G01C 17/00; G01C 21/1656; G01C 9/00; G01C 21/3626; G01C 21/3673; G01C 17/26; G01C 21/32; G01C 21/3446; G01C 21/36; G01C 21/3655; G01C 9/08; G01C 19/56; G01C 21/00; G01C 21/3415; G01C 21/3461; G01C 21/3682; G01C 19/04; G01C 21/1652; G01C 21/34; G01C 21/3484; G01C 22/006; G01C 21/08; G01C 21/10; G01C 21/3407; G01C 21/3492; G01C 21/3614; G01C 9/005; G01C 19/02; G01C 21/005; G01C 21/025; G01C 21/3688; G01C 9/12; G01C 15/14; G01C 19/005; G01C 19/28; G01C 21/343; G01C 21/3644; G01C 9/14; G01C 13/006; G01C 13/008; G01C 19/34; G01C 21/02; G01C 21/04; G01C 21/206; G01C 21/3605; G01C 21/3611; G01C 21/362; G01C 21/3641; G01C 21/3647; G01C 21/3685; G01C 21/3697; G01C 21/3815; G01C 22/02; G01C 22/025; G01C 7/04; G01C 9/06; G01C 15/00; G01C 19/24; G01C 19/36; G01C 21/1654; G01C 21/265; G01C 21/3819; G01C 21/3822; G01C 21/3896; G01C 1/10; G01C 13/002; G01C 17/10; G01C 17/20; G01C 17/36; G01C 19/08; G01C 19/12; G01C 19/14; G01C 19/20; G01C 19/26; G01C 19/30; G01C 19/40; G01C 19/5642; G01C 19/5719; G01C 19/5776; G01C 19/727; G01C 21/06; G01C 21/3453; G01C 21/3635; G01C 21/3638; G01C 21/365; G01C 21/3658; G01C 21/3676; G01C 21/3679; G01C 21/3691; G01C 21/3811; G01C 21/3837; G01C 21/3841; G01C 21/3844; G01C 21/3848; G01C 21/3878; G01C 21/3881; G01C 21/3889; G01C 22/00; G01C 3/10; G01C 5/04; G01C 9/10; G01C 9/22; G01C 19/5614; G01C 19/58; G01C 19/64; G01C 21/24; G01C 21/3438; G01C 21/3608; G01S 1/02; G01S 19/42; G01S 19/41; G01S 19/49; G01S 19/47; G01S 7/04; G01S 13/60; G01S 19/09; G01S 19/44; G01S 3/782; G01S 5/0027; G01S 5/009; G01S 19/52; G01S 1/047; G01S 11/02; G01S 13/86; G01S 13/913; G01S 17/95; G01S 19/13; G01S 2205/002; G01S 5/0009; G01S 19/07; G01S 19/256; G01S 19/37; G01S 19/46; G01S 1/72; G01S 13/882; G01S 15/60; G01S 17/58; G01S 19/04; G01S 19/11; G01S 19/14; G01S 19/235; G01S 19/252; G01S 19/254; G01S 19/258; G01S 19/35; G01S 19/45; G01S 19/53; G01S 5/0036; G01S 5/0045; G01S 5/0054; G01S 5/08; G01S 5/16; G01S 5/163; G01S 7/40; G01S 1/68; G01S 13/785; G01S 17/86; G01S 19/05; G01S 19/071; G01S 19/15; G01S 19/25; G01S 19/28; G01S 3/7868; G01S 5/02; G01S 5/10; G01S 7/22; G01S 1/04; G01S 1/045; G01S 1/14; G01S 1/20; G01S 1/24; G01S 13/286; G01S 13/426; G01S 13/89; G01S 13/90; G01S 13/953; G01S 15/08; G01S 15/10; G01S 15/86; G01S 15/87; G01S 15/96; G01S 17/42; G01S 17/50; G01S 17/875; G01S 17/88; G01S 17/931; G01S 19/06; G01S 19/08; G01S 19/17; G01S 19/20; G01S 19/22; G01S 19/23; G01S 19/26; G01S 19/27; G01S 19/29; G01S 19/30; G01S 19/32; G01S 19/34; G01S 19/39; G01S 19/426; G01S 19/48; G01S 19/50; G01S 19/54; G01S 2205/008; G01S 3/46; G01S 3/64; G01S 3/781; G01S 3/7867; G01S 3/8022; G01S 3/805; G01S 5/00; G01S 5/0018; G01S 5/0226; G01S 5/06; G01S 5/12; G01S 7/003; G01S 7/022; G01S 7/12; G01S 7/412; G01S 7/4806; G01S 7/481; G01S 7/4811; G01S 7/497; G01S 1/08; G01S 1/54; G01S 1/7038; G01S 11/10; G01S 13/865; G01S 13/874; G01S 13/904; G01S 13/935; G01S 19/03; G01S 19/072; G01S 19/074; G01S 19/10; G01S 19/12; G01S 19/24; G01S 19/36; G01S 19/38; G01S 2007/52012; G01S 2201/01; G01S 3/783; G01S 5/0063; G01S 7/06; G01S 7/38; G01S 7/4021; G01S 7/48; G01S 7/495; G01S 7/51

USPC ......................................................... 73/178 R

See application file for complete search history.

(56) References Cited

U.S. PATENT DOCUMENTS

| | | | |
|---|---|---|---|
| 2005/0232466 A1 | 10/2005 | Kampchen et al. | |
| 2011/0063157 A1 | 3/2011 | Jordan et al. | |
| 2018/0316850 A1* | 11/2018 | Friebe | B60R 1/27 |
| 2019/0025433 A1* | 1/2019 | Yang | G01S 17/93 |
| 2020/0278681 A1* | 9/2020 | Gier | G05D 1/0246 |
| 2024/0020846 A1* | 1/2024 | Zhang | G06V 10/44 |

FOREIGN PATENT DOCUMENTS

| | | |
|---|---|---|
| DE | 10 2006 057 277 A1 | 6/2008 |
| DE | 10 2015 207 318 A1 | 10/2016 |
| EP | 1 995 692 A2 | 11/2008 |
| EP | 3 432 032 A1 | 1/2019 |

OTHER PUBLICATIONS

German-language Written Opinion (PCT/ISA/237) issued in PCT Application No. PCT/EP2022/053993 dated Jun. 3, 2022 with English translation (26 pages).

German-language Search Report issued in German Application No. 10 2021 104 015.9 dated Sep. 2, 2021 with partial English translation (10 pages).

\* cited by examiner

METHOD FOR DETECTING OBJECTS IN THE SURROUNDINGS OF A VEHICLE BY DETERMINING COVERAGE OF THE OBJECTS, COMPUTING DEVICE, AND SENSOR SYSTEM

BACKGROUND AND SUMMARY OF THE INVENTION

The present invention relates to a method for capturing objects in a surrounding area of a vehicle. In addition, the present invention relates to a computing device and to a sensor system for a vehicle. Finally, the present invention relates to a computer program and to a computer-readable storage medium.

Sensor systems for vehicles that comprise vicinity sensors are known from the prior art. These vicinity sensors can be used to provide corresponding sensor data describing the surrounding area of the vehicle. On the basis of the sensor data, it is then possible to identify objects and in particular other road users in the surrounding area. Reliable identification of other objects and in particular other road users in the surrounding area is essential for automated or autonomous operation of vehicles.

In order to reliably register the other road users and to enable their tracking over time, typically an estimation for the existence of the road users is carried out. If such an existence or probability of existence is too low, the detection of the road user cannot be relied upon. It may also be the case that an object which exists in reality is temporarily and/or in part obscured by another object. This can result in a reduction in the probability of existence of the object. In addition, the object might be deleted during further tracking, which in turn has the result that a driver assistance system of the vehicle no longer reacts to the object. In the worst-case scenario, this can result in a collision with the object.

In the current prior art, typically only the registration region or viewing region of the vicinity sensor is taken into account. As soon as an object is present in this registration region, the system awaits a measurement or a detection of the object on the basis of the sensor data. Therefore, the probability of existence is increased. However, if no measurement is received, the probability of existence drops and the object is deleted. As a consequence, the obscuration causes true and relevant objects to be identified as faulty measurements. The obscuration of objects can also occur when using what is known as a "ray tracking model" separately for each vicinity sensor. Many road users or objects are present in the surrounding area of the vehicle in particular in urban traffic. Such a method would therefore lead to a great deal of computing effort.

It is the object of the present invention to provide a solution regarding how objects in a surrounding area of a vehicle can be captured more efficiently and at the same time reliably taking into account obscuration.

This object is achieved according to the invention by a method, by a computing device, by a sensor system, by a computer program, and by a computer-readable (storage) medium having the features in accordance with the claims.

A method according to embodiments of the invention serves for capturing objects in a surrounding area of a vehicle. The method comprises receiving sensor data describing the objects in the surrounding area from a vicinity sensor of the vehicle. In addition, the method comprises determining respective corners of the objects, with the corners describing outer boundaries of the respective object. The method furthermore comprises determining a relative orientation of the respective corners in relation to the vicinity sensor. The method furthermore comprises arranging the determined corners in order in a predetermined angle direction. In addition, the method comprises checking each of the corners along the angle direction as to whether the corner is obscured by another of the objects, on the basis of the relative orientation of the respective corners in relation to the vicinity sensor, and determining regions of the respective objects that are capturable for the vicinity sensor on the basis of the checking of the corners.

Objects and in particular other road users in the surrounding area of the vehicle are intended to be captured by way of the method. The method can be carried out with a corresponding computing device which can be formed, for example, by an electronic control device of the vehicle or a sensor system of the vehicle. During operation of the vehicle, the vicinity sensor can be used to record the sensor data. The sensor data here describe the surrounding area of the vehicle or a region of the surrounding area. The vicinity sensor can be used to perform temporally successive measurement cycles, wherein the sensor data are provided in each measurement cycle. These sensor data can then be transmitted from the vicinity sensor to the computing device for further evaluation. In principle, the method can also be performed on the basis of sensor data from a plurality of vicinity sensors.

On the basis of the sensor data, the respective objects in the surrounding area can be identified. In addition, the relative orientation of the objects in relation to the vicinity sensor can be determined on the basis of the sensor data. Provision is furthermore made for the corners of the objects to be determined. These corners or else edges describe the outer boundaries of the object. For example, the outermost left corner and the outermost right corner can be defined as the corners. In particular, two corners that describe the spatial extent of the object in the predetermined angle direction can be determined. This angle direction can in particular be the azimuth direction. The corners of the respective objects are assigned an angle. Next, the corners are arranged in order in dependence on their angle values in the angle direction or in the azimuth direction. In particular, the corners can be arranged by their angle value in increasing or decreasing order. Next, the individual corners are checked in order in the angle direction. It is possible to examine for each corner whether it is obscured by one or more other objects or whether the corner is visible to the vicinity sensor. In that case, the examination of whether the corner is obscured or visible takes place on the basis of the determined relative orientation of the objects or of their corners in relation to the vicinity sensor.

It is possible to derive from the check of all corners of the objects in the surrounding area of the vehicle those regions or proportions of the respective objects that are obscured and those that are visible to the vicinity sensor. It is also possible to determine the capturable region for each of the objects. This capturable region describes that region or proportion of the object which can be captured or seen with the vicinity sensor. In the method, a list of corners is determined, and the corners are examined in order or in the angle direction. This thus offers the advantage that this list of corners needs to be worked through only once for a measurement cycle or evaluation step. In comparison with known tracking models, the computing effort can thus be significantly reduced. As a result, the obscuration of the objects in the surrounding area can be ascertained more efficiently and at the same time reliably.

In addition, a proportion of the respective objects that is located in a capture region of the vicinity sensor is preferably determined, and the capturable regions are determined in dependence on that proportion. The capture region, which is also referred to as the viewing region or as field of view, describes that region of the surrounding area in which objects can be captured using the vicinity sensor. The object can be tracked on the basis of the measurements using the vicinity sensor. In this way, the position and/or the spatial dimensions of the object are known for example from preceding measurement cycles. Furthermore, the capture region of the vicinity sensor is known. On the basis of these pieces of information, it is then possible to determine which proportion of the object lies or is arranged in the capture region. This proportion of the object in the capture region can then be taken into account in the determination of the capturable region. It is thus possible to determine which part of the object can actually currently be captured.

In a further embodiment, an obscuration list is determined in which the respective objects are entered in dependence on the relative orientation of their corners in relation to the vicinity sensor, wherein the obscuration list is updated during the checking of the respective corners along the angle direction. As has been explained previously, the individual corners are checked in order or in the angle direction. The obscuration list can be updated during the examination of the respective corners. The objects or corners can be entered in the obscuration list. The identified objects can also be assigned an identifier or ID. This identifier can be entered in the obscuration list. In this case, the first object in the obscuration list can be the object whose corner is visible. The second object in the obscuration list can be obscured for example by the first object. It is also possible to take into account whether the respectively examined corner describes the beginning or the end of the object in the angle direction. If the corner describes the end of the object, the object can be deleted from the obscuration list.

It is furthermore advantageous if, for determining the capturable regions of the respective objects, an angle list which describes capturable angle regions of the respective objects is determined, wherein the angle list is updated during the checking of the respective corners along the angle direction. Provision may additionally be made for an angle that is assigned to a last change to be stored. On the basis of this angle and of the previously described obscuration list, it is possible to ascertain for which angle region or azimuth region an object or part of an object is visible to the vicinity sensor. Overall, it is thus possible to ascertain the capturable regions of the respective objects with little computing effort.

In a further embodiment, the respective corners of the objects are determined in polar coordinates. It is possible by way of a tracking algorithm to predict the respective position of the objects at the measurement time of the vicinity sensor on the basis of the sensor data. These tracks, which describe the objects or the positions thereof, can be transformed into the capture region of the vicinity sensor. The objects or tracks can then be defined in polar coordinates. In this way, the corners can be given in each case by an angle and a distance or radius. The angle can in this case correspond in particular to the azimuth angle. Using the radius, the relative orientation between the vicinity sensor and the corner can be determined. Provision may also be made for not only the radius but also the angle between the vicinity sensor and the corner to be taken into account in the computation of the relative orientation. In this way, the obscuration can also be carried out reliably for corners that have a small distance from the vicinity sensor but are assigned to an obscured object.

It is furthermore advantageous if a probability of existence for the respective objects is determined in dependence on the capturable regions of the objects. The tracking of the respective objects can preferably also be carried out on the basis of the determined capturable regions. It is thus possible to react to an object that is currently not visible to the vicinity sensor. When the object is visible again, there will already be an estimation relating to the position and speed which can be used directly. This offers an advantage over known methods in which the obscured objects are deleted. In addition, known methods require a certain number of measurements before the object is deemed to have been confirmed in the first place. In addition, a specific initialization time for estimating the entire state of movement is required.

The calculation of the visibility, which is based on the capture region, is combined with the obscuration by other objects with the aid of the method according to embodiments of the invention. In heavy inner-city traffic, the number of the further objects in the surrounding area can lie in the range of between 100 and 200. In the worst-case scenario, a mutual obscuration for all possible combinations of objects would have to be calculated. The method according to embodiments of the invention helps to significantly reduce the computing effort. Trials in this respect have shown that the computing time increases approximately linearly with the number of objects in the surrounding area.

A computing device according to embodiments of the invention for a sensor system of a vehicle is configured for carrying out a method according to embodiments of the invention and the advantageous configurations. The computing device can be formed in particular by an electronic control device of the vehicle.

A sensor system according to embodiments of the invention comprises a computing device according to embodiments of the invention and at least one vicinity sensor. The vicinity sensor can be in the form of a radar sensor, a lidar sensor or a camera. The vicinity sensor can also have a capture region of 360° with respect to the azimuth direction. The sensor system can also include a plurality of vicinity sensors and also different types of vicinity sensors.

If a vicinity sensor having a capture region of 360° is used, the method according to embodiments of the invention can likewise be used. In this case, the angle region can be defined for example from 0° to 360° or from −180° to 180°. In this case, if objects extend over the defined angle limit of from 1800 to −180° or from 360° to 0°, problems can occur. In the present case, provision is made for objects that extend over the angle limit to be split into two partial objects. The split is effected here at the angle limit. In other words, such an object is then assigned four corners overall. However, the same identifier can be given to the two partial objects.

The sensor system can be part of a driver assistance system of the vehicle. The driver assistance system can be used to maneuver the vehicle in automated or autonomous fashion. A vehicle according to embodiments of the invention comprises a sensor system according to embodiments of the invention. The vehicle is in particular a passenger vehicle.

A further aspect of the invention relates to a computer program comprising commands that cause a computing device, when the program is executed by the latter, to carry out a method according to embodiments of the invention and the advantageous configurations thereof. The invention furthermore relates to a computer-readable storage medium comprising commands that cause a computing device, upon execution by the latter, to carry out a method according to embodiments of the invention and the advantageous configurations thereof.

The preferred embodiments introduced with respect to the method according to the invention and the advantages thereof apply correspondingly to the computing device according to embodiments of the invention, to the sensor system according to embodiments of the invention, to the driver assistance system according to embodiments of the invention, to the vehicle according to embodiments of the invention, to the computer program according to embodiments of the invention, and to the computer-readable storage medium according to embodiments of the invention.

Further features of the invention are evident from the claims, the figures and the description of the figures. The features and feature combinations that have been mentioned previously in the description and the features and feature combinations that will be mentioned below in the description of the figures and/or are shown in the figures alone are utilizable not only in the respectively given combination but also in other combinations or by themselves, without departing from the scope of the invention.

The invention will now be explained in more detail with reference to preferred exemplary embodiments and with reference to the attached drawings.

DETAILED DESCRIPTION OF THE DRAWINGS

Identical or functionally identical elements are provided with the same reference signs in the figures.

Figure 1:
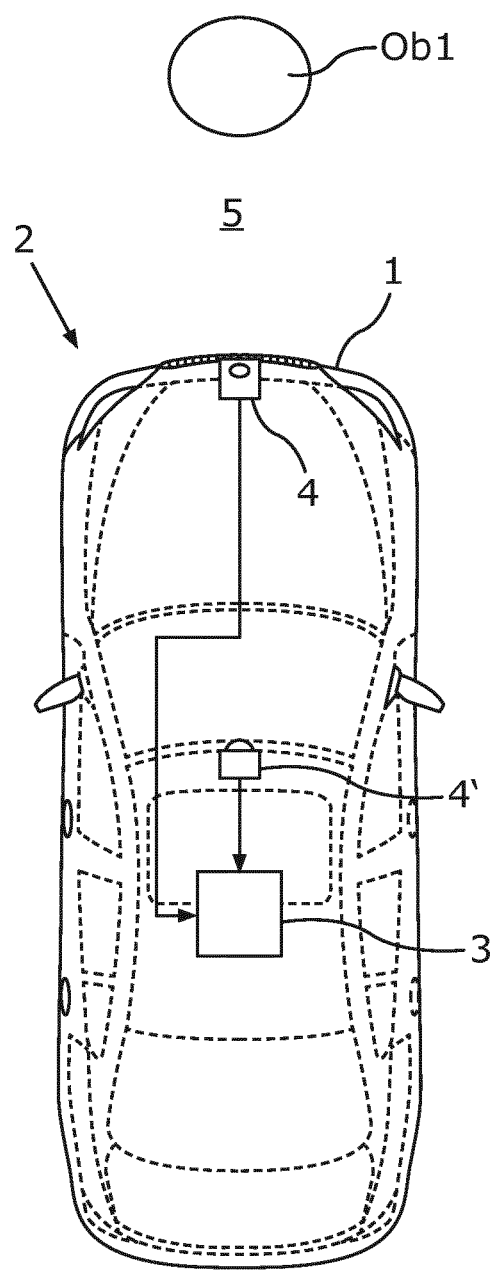
FIG. 1 shows a schematic illustration of a vehicle having a sensor system with vicinity sensors and of an object in the surrounding area of the vehicle.

FIG. 1 shows a schematic illustration of a vehicle 1, which in the present case is a passenger vehicle, in a top view. The vehicle 1 comprises a sensor system 2, by way of which objects Ob1, Ob2, Ob3 in a surrounding area 5 of the vehicle 1 can be captured. FIG. 1 shows as an example an object Ob1 in the surrounding area 5 of the vehicle 1. The sensor system 2 comprises vicinity sensors 4, 4' with which measurement values or sensor data describing the object Ob1 in the surrounding area 5 can be provided. In the present example, the sensor system 2 comprises a first vicinity sensor 4, which is in the form of a radar sensor, and a second vicinity sensor 4', which is in the form of a camera.

In addition, the sensor system 2 comprises a computing device 3, which can be formed for example by an electronic control device. The sensor data that are provided using the vicinity sensors 4, 4' are transmitted to the computing device 3 and evaluated accordingly in order to identify the object Ob1. To this end, a corresponding computer program can be executed on the computing device 3.

Figure 2A:
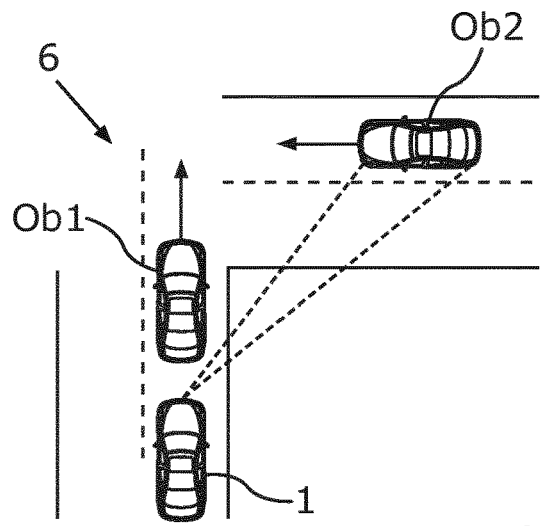
FIGS. 2a-2c show schematic illustrations of a traffic situation for successive time points, wherein two further vehicles are located in the surrounding area of the vehicle.
Figure 2B:
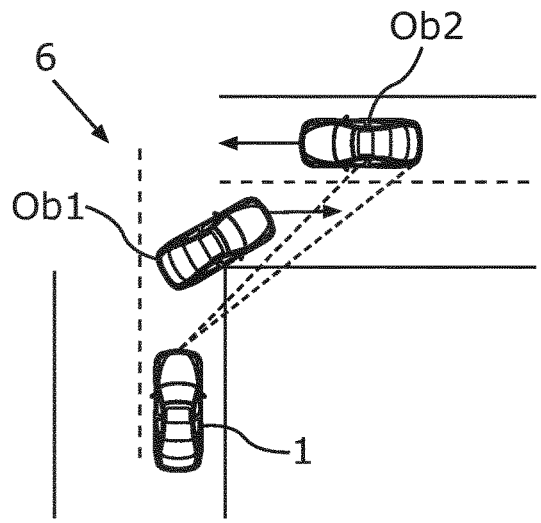
Figure 2C:
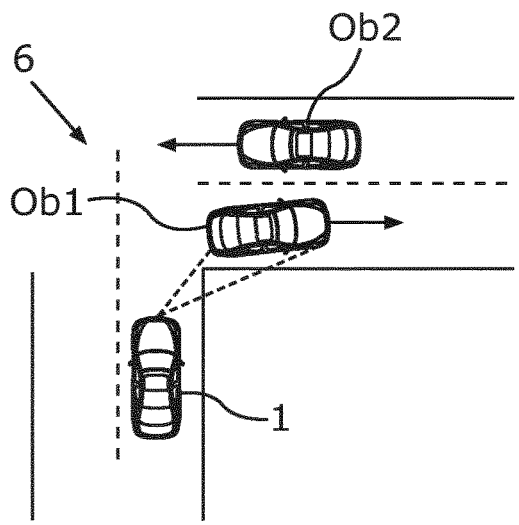

FIGS. 2a to 2c show schematic illustrations of the vehicle 1, which is located in an inner-city traffic situation. FIGS. 2a to 2c describe successive time steps in this case. According to FIG. 2a, the vehicle 1 follows a first object Ob1, which is a further vehicle. The vehicle 1 and the first object Ob1 move in the direction of a crossing 6. A second object Ob2, which is a further vehicle, is moving toward this crossing 6 from the right. In this traffic situation, the second object Ob2 has right of way at the crossing 6. The second object Ob2 can be captured in its entirety by the vicinity sensors 4, 4' of the vehicle 1 when the second object Ob2 is located in the capture regions of the respective vicinity sensors 4, 4'. In this way, the second object Ob2 can be tracked with the aid of a tracking algorithm.

FIG. 2b shows the traffic situation at a later time point. Here, the first object Ob1 is turning to the right in a manner such that the first object Ob1 obscures part of the second object Ob2 for the vicinity sensors 4, 4' of the vehicle 1. FIG. 2c shows the traffic situation again at a later time point. Here, the first object Ob1 obscures the second object Ob2 completely for the vicinity sensors 4, 4' of the vehicle 1. If the obscuration were not taken into account, the vicinity sensors 4, 4' would not provide any new pieces of information relating to the second object Ob2. The result of this would be that the tracking algorithm would reduce the probability of existence of the second object Ob2 because the second object Ob2 is located directly in front of the vehicle 1 in the capture region of the vicinity sensors 4, 4'. After a specific amount of time, the second object Ob2 might even be deleted in the tracking algorithm. The probability of existence is typically determined using an assumption for the detection probability of the respective vicinity sensor 4, 4'. For example, it can be assumed that the camera is configured to detect a further vehicle at a distance of 15 m with a probability of 99% and a false positive rate. If the second object Ob2 is identified again after the obscuration, it would, after a specific amount of time, be identified as a new object.

In the present case, the intention is to determine the obscuration of objects Ob1, Ob2, Ob3 in the surrounding area 5 of the vehicle 1. For example, in the case shown in FIG. 2b, an output that 50% of the second object Ob2 is obscured is to be given. Based on the specifications of the vicinity sensors 4, 4', the detection probability could be significantly reduced. For example, it can be assumed that the camera detects the half-obscured object Ob2 with a probability of 30%, and the radar sensor has a detection probability of 70%. If the second object Ob2 is obscured completely, as is shown in FIG. 3c, detection probabilities in the region of 0% can be assumed, and thus the probability of existence is not reduced. In this way, the identified object Ob2 is not deleted in the tracking algorithm. This offers the advantage that the presence of the second object Ob2 is known and consequently a braking maneuver can be initiated by the vehicle 1 or by a driver assistance system of the vehicle 1. As soon as the second object Ob2 is no longer obscured, it can be assigned to the current measurement by the vicinity sensors 4, 4'.

Figure 3:
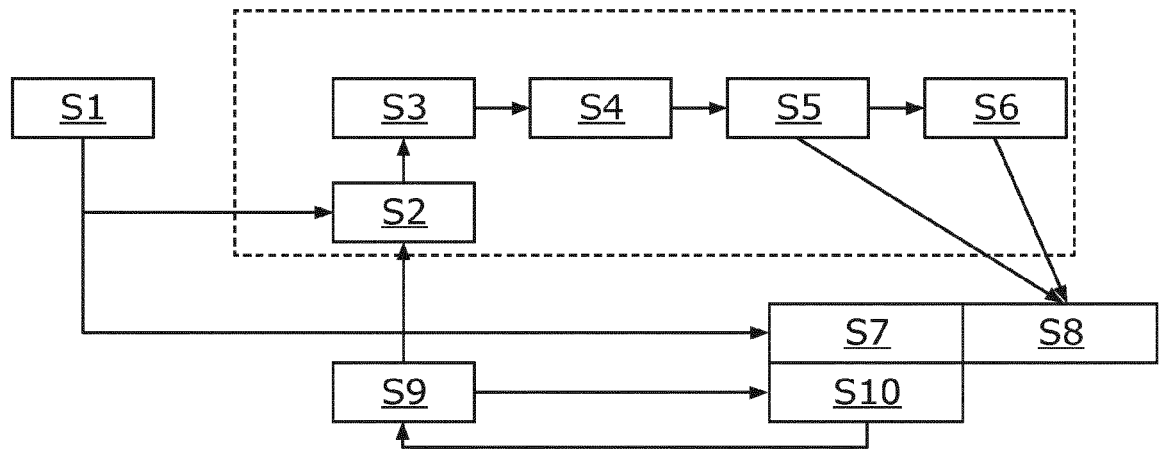
FIG. 3 shows a schematic flow chart of a method for capturing the objects in the surrounding area of the vehicle.

FIG. 3 shows a schematic flow chart of a method for capturing objects Ob1, Ob2, Ob3 in the surrounding area 5 of the vehicle 1. The method will be explained by way of example for one vicinity sensor 4, 4', but can also be carried out for all vicinity sensors 4, 4' of the vehicle 1. In a step S1, the sensor data are provided using the vicinity sensor 4, 4'. Temporally successive measurement cycles are carried out using the vicinity sensor 4, 4'. The sensor data from the vicinity sensor 4, 4' are transmitted to the computing device 5 3, and, in a step S2, the respective positions of what are known as tracks at the measurement time of the vicinity sensor 4, 4' are predicted by way of the tracking algorithm. These tracks describe the respective objects Ob1, Ob2, Ob3 in the surrounding area 5. In a step S3, the tracks are then transformed into the capture region of the vicinity sensor 4, 4' or into the sensor coordinate system. In a step S4, a transformation into polar coordinates then takes place. In a step S5, a check as to whether the tracks or objects Ob1, Ob2, Ob3 are located in the capture region of the vicinity sensor 4, 4' is then performed. In a step S6, the obscuration of the respective objects Ob1, Ob2, Ob3 is determined.

In a step S7 of the method, an assignment and update take place on the basis of the sensor data. In a step S8, the probability of existence for the objects Ob1, Ob2, Ob3 is updated. This is done on the basis of the results from steps S5 and S6. In a step S9, a list of the identified tracks or objects Ob1, Ob2, Ob3 is compiled, which is updated in a step S10. The update can be carried out here in each measurement cycle. The relevant steps of the method will be explained in more detail below.

Figure 4:
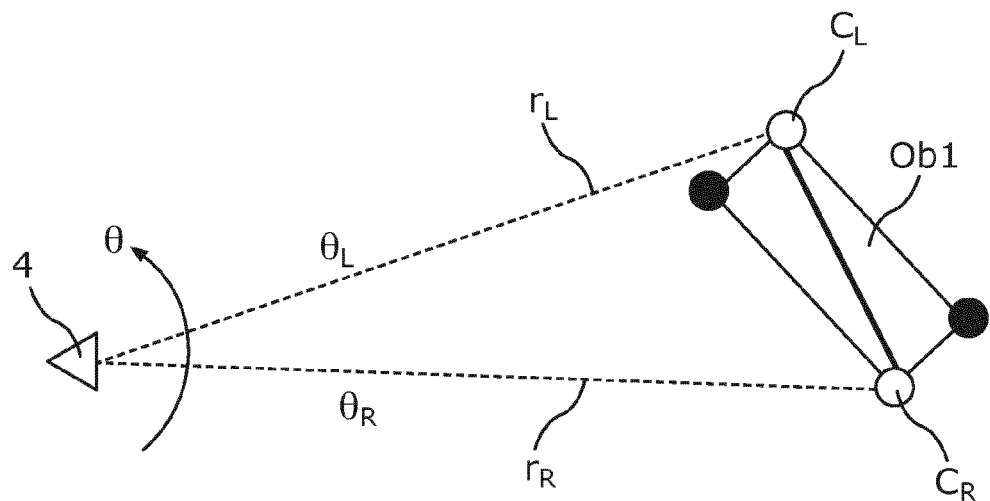
FIG. 4 shows a schematic illustration of a vicinity sensor and of an object, with corners of the object being defined in polar coordinates.

The transformation into polar coordinates in accordance with step S3 of the method will be explained in more detail below with reference to FIG. 4. FIG. 4 shows a schematic illustration of the vicinity sensor 4 and of an object Ob1. As explained previously, the detected object Ob1 is transformed into polar coordinates after the transformation into the sensor coordinate system. Here, the object Ob1 is assumed to be a rectangle or a two-dimensional box. The object Ob1 or the corners $C_R$, $C_L$ of the object Ob1 can be described in polar coordinates in each case via an angle $\theta$ and a radius r. In the present case, the angle $\theta$ corresponds to the azimuth angle. It is assumed here that the individual objects Ob1, Ob2, Ob3 or boxes do not overlap. Therefore, only the corner $C_R$ at the right-hand periphery, which corner is defined by the angle $\theta_R$ and the radius $r_R$, and the corner $C_L$ at the left-hand periphery, which corner is defined by the angle $\theta_L$ and the radius $r_L$ will be used to describe the object Ob1. In this way, each object Ob1, Ob2, Ob3 having four corners can be reduced to the two corners $C_R$, $C_L$ and be stored with the associated identifier. In addition, the coordinates of the corner $C_R$ at the right-hand periphery and/or the corner $C_L$ at the left-hand periphery can be stored.

According to step S5, the objects Ob1, Ob2, Ob3 which are located in the capture region of the vicinity sensor 4, 4' are identified. It is possible to check here if the two outer corners $C_R$, $C_L$ of the respective objects Ob1, Ob2, Ob3 are located in the capture region. The capture region describes the region in the surrounding area 5 of the vehicle 1 in which objects Ob1, Ob2, Ob3 can be captured using the vicinity sensor 4, 4'. The capture region can be defined by a maximum radius and an angle region extending from $-\theta_S$ to $\theta_S$. First, it is possible to check whether the distance or the radius $r_R$, $r_L$ of one of the corners $C_R$, $C_L$ is greater than the maximum radius of the capture region. If this is the case, it can be assumed that the object Ob1, Ob2, Ob3 is not located in the capture region and is not visible.

Next it is possible to determine the extent AO of the object Ob1, Ob2, Ob3 in the azimuth direction according to the following equation: $\Delta\theta = \theta_L - \theta_R$. Next, the new angle at the left-hand periphery can be determined according to the following equation: $\theta_L = \min(\theta_L, \theta_S)$. The new angle at the right-hand periphery can be determined according to the following equation: $\theta_R = \min(\theta_R, -\theta_S)$. It is then possible to determine the proportion of the object within the capture region from the quotient $(\theta_L - \theta_R)/\Delta\theta$. Finally, the new angles at the peripheries $\theta_L$, $\theta_R$ can be stored. It is also possible, on the basis of angles, to first check whether the object Ob1, Ob2, Ob3 is located in the capture region. For example, if one corner $C_R$, $C_L$ of the object Ob1, Ob2, Ob3 is located in the capture region, it can be assumed that the object Ob1, Ob2, Ob3 is located in the capture region.

During the determination of the obscuration of the objects Ob1, Ob2, Ob3 in accordance with step S6 of the method, the respective outer corners $C_R$, $C_L$ of the objects Ob1, Ob2, Ob3 are extracted and then arranged in order in the azimuth direction. Subsequently, the corners $C_R$, $C_L$ are analyzed in order or in the azimuth direction. Four different scenarios can be assumed in this case: The right corner $C_R$ is assigned to the start of the object Ob1, Ob2, Ob3 and visible, the right corner $C_R$ is assigned to the start of the object Ob1, Ob2, Ob3 and obscured, the left corner $C_L$ is assigned to the end of the object Ob1, Ob2, Ob3 and visible, or the left corner $C_L$ is assigned to the end of the object Ob1, Ob2, Ob3 and obscured.

In addition to the list with the corners $C_R$, $C_L$, in particular a list in which the currently obscured objects Ob1, Ob2, Ob3 are listed can be provided. This list will be referred to below as obscuration list 7. The order in this obscuration list 7 can then indicate in which order the objects Ob1, Ob2, Ob3 are arranged. The first object Ob1, Ob2, Ob3 in the obscuration list 7 can have the smallest distance from the vehicle 1 or the vicinity sensor 4, 4', and the next object Ob1, Ob2, Ob3 in the list can be arranged, starting from the vicinity sensor 4, 4', behind the first object Ob1, Ob2, Ob3 in the obscuration list 7. Moreover, a list in which the respective visible angle or azimuth angle of the objects is described can be provided. This list will be referred to below as angle list 8.

When checking the obscuration, first the corner $C_R$ of the object Ob1, Ob2, Ob3 on the outermost right-hand side is considered. A check is performed as to whether this corner $C_R$ is obscured or whether another object Ob1, Ob2, Ob3 is located in front of this corner $C_R$ with reference to the vicinity sensor 4, 4'. To this end, this corner $C_R$ is compared with the objects Ob1, Ob2, Ob3 in the obscuration list. In the easiest scenario, the radii or distances of the corners $C_R$, $C_L$ can be compared with one another here. Depending on the dimensions or the spatial extents of the objects Ob1, Ob2, Ob3 in the azimuth direction, it may, however, be the case that a corner $C_R$ of a second object Ob2 has a smaller distance from the vicinity sensor 4, 4' than a corner $C_R$ of a first object Ob1, wherein the first object Ob1 obscures the second object Ob2. For this reason, in order to determine the obscuration, the scalar product of the corners, for example, is determined, if a positive or negative angle between the currently visible corner and the newly defined outermost corner $C_R$ at the right-hand periphery is present.

If the corner $C_R$ at the outermost right-hand periphery is visible, the object Ob1, Ob2, Ob3 assigned to the corner $C_R$ is recorded in the first location of the obscuration list 7. The visible azimuth angle is determined for the object Ob1, Ob2, Ob3 which previously occupied the first location and is now in the second location. This is done on the basis of the angle $\theta_R$ of the object Ob1, Ob2, Ob3 which has been newly inserted into the obscuration list 7 and of the angle at which the last change took place. The determined visible azimuth angle is entered in the angle list 8, and the angle with the last change is updated. If the corner $C_R$ at the outermost right-hand periphery is not visible, it is compared with the closest objects Ob1, Ob2, Ob3 in the obscuration list 7 to check whether it is visible. This is carried out until the corner is identified as being visible. Next, the object Ob1, Ob2, Ob3 is placed in the obscuration list 7 in the correct location.

In the following text, the obscuration of the corner $C_L$ at the outermost left-hand periphery is examined. If the corner $C_L$ is visible, or if the corner $C_L$ is in the first position in the obscuration list, the visible azimuth angle in the angle list 8 is updated. In addition, the corner $C_L$ is deleted from the current obscuration list 7, and the azimuth angle of the last change is updated. If the corner $C_L$ is not visible, the object Ob1, Ob2, Ob3 is deleted from the current obscuration list 7. As a final step, the visible region of the object Ob1, Ob2, Ob3 is determined on the basis of the visible azimuth angle and the previously calculated proportion of the object Ob1, Ob2, Ob3 in the capture region. If, for example, half the object Ob1, Ob2, Ob3 is located in the capture region, the proportion of the object Ob1, Ob2, Ob3 in the capture region is 50%. If 60% of this proportion in the capture region is not obscured, a total of 30% of the object Ob1, Ob2, Ob3 is visible to the vicinity sensor 4, 4'.

Figure 5:
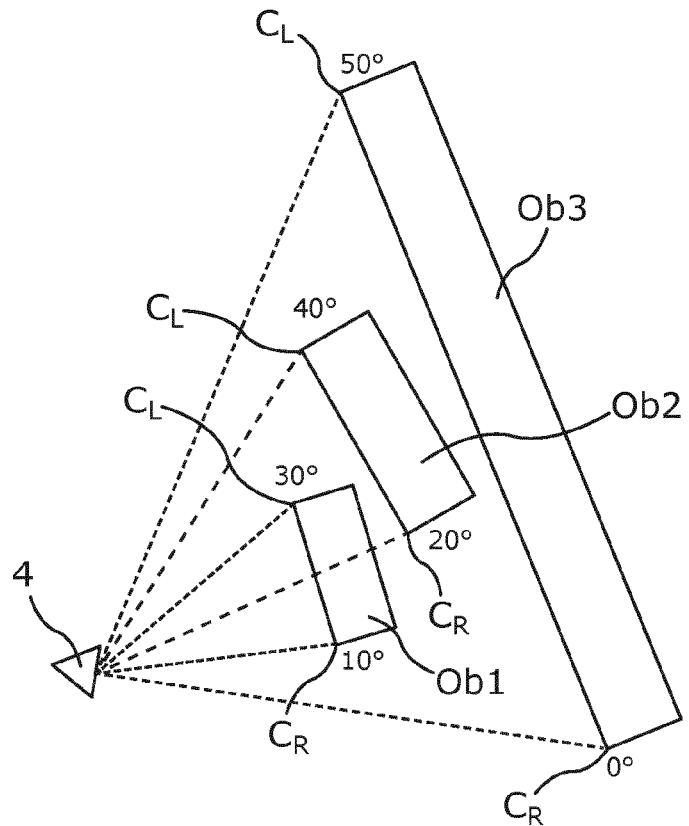
FIG. 5 shows a schematic illustration of a vicinity sensor and of three objects, two of which are in part obscured to the vicinity sensor.

The method will be illustrated by way of an example below. It is assumed here that three objects Ob1, Ob2, Ob3 are located in the surrounding area 5 of the vehicle 1. These objects Ob1, Ob2, Ob3 are illustrated by way of example in FIG. 5. For the sake of clarity, only the vicinity sensor 4 is illustrated of the vehicle 1 here. The third object Ob3 extends in an angle region between 0° and 50°. For simplification it is assumed that the distance between the vicinity sensor 4 and the respective corners $C_R$, $C_L$ of the third object Ob3 is 20 m. The second object Ob2, which is located in part in front of the third object Ob3, extends in an angle region between 20° and 40°. For simplification it is assumed that the distance between the vicinity sensor 4 and the respective corners $C_R$, $C_L$ of the second object Ob2 is 15 m. The first object Ob1, which is located in part in front of the second object Ob2 and in part in front of the third object Ob3, extends in an angle region between 10° and 30°. For simplification it is assumed that the distance between the vicinity sensor 4 and the respective corners $C_R$, $C_L$ of the first object Ob1 is 10 m.

Figure 6A:
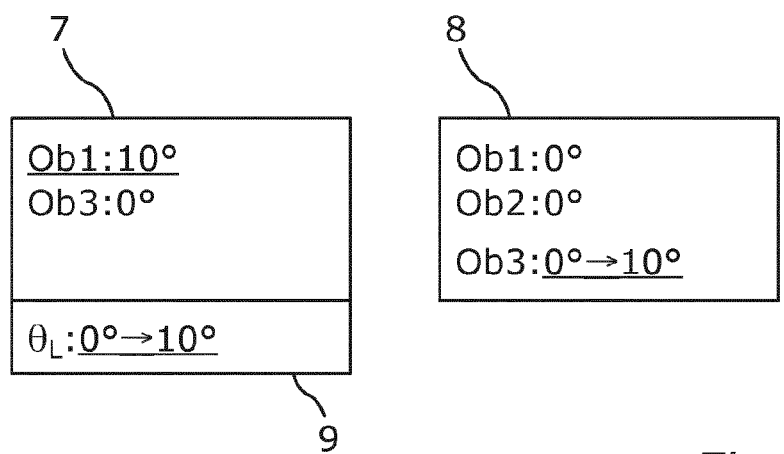
FIGS. 6a-6d show obscuration lists, angle lists and regions with angles for different evaluation steps for determining the obscuration of the objects in accordance with FIG. 5.

The respective corners $C_R$, $C_L$ of the objects Ob1, Ob2, Ob3 are first arranged in order in the azimuth direction. The outermost right corner $C_R$ of the third object Ob3, which corner is assigned to the angle of 0°, is considered first. This corner $C_R$ is entered in the first location in the current obscuration list 7. Next, the outermost right corner $C_R$ of the first object Ob1, which corner is assigned to the angle of 10°, is considered. This corner $C_R$ is identified as a newly visible corner and entered in the first location in the obscuration list 7, and the corner of the third object Ob3 is shifted to the second location in the obscuration list 7. In the angle list 8 with the visible azimuth angles, each object Ob1, Ob2, Ob3 is initially assigned the angle of 0°. The visible azimuth angle of the third object Ob3 is calculated to 10° and updated in the angle list 8. Furthermore, the last azimuth angle $\theta_L$ or the angle at which the last change took place is updated from 0° to 10°. In this respect, FIG. 6a shows the obscuration list 7, the angle list 8, and a region 9 for the last azimuth angle $\theta_L$. In the schematic drawings, the changes in the lists 7, 8, 9 are marked by underlining.

Figure 6B:
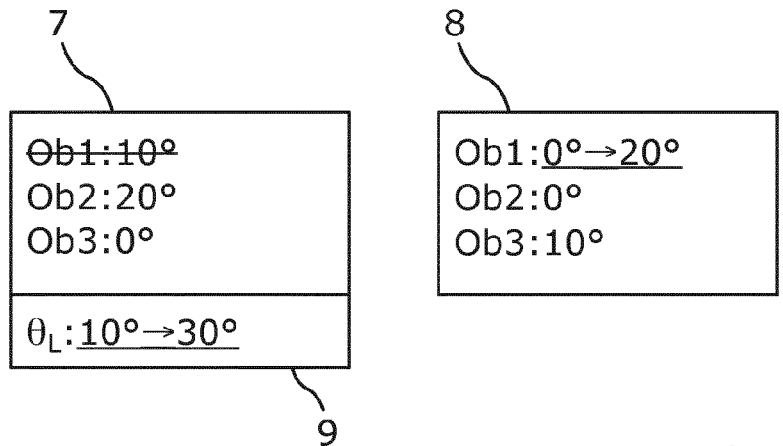

FIG. 6b shows the obscuration list 7, the angle list 8, and the region 9 for a subsequent step. By now, the outermost right corner $C_R$ of the second object Ob2, which is assigned to the angle of 20°, has been inserted at the second position in the obscuration list 7. Next, the outermost left corner $C_L$ of the first object Ob1, which is assigned to the angle of 30°, is examined. From the difference between this angle of 30° and the last azimuth angle $\theta_L$ of 10°, the visible angle of 20° of the first object Ob1 is then calculated and updated in the angle list 8. In addition, the first object Ob1 is deleted from the obscuration list 7. The last azimuth angle $\theta_L$ is updated from 10° to 30°.

Figure 6C:
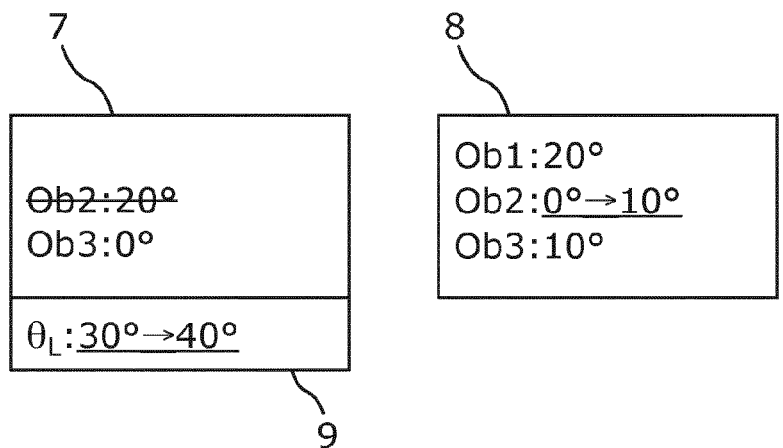

FIG. 6c shows the obscuration list 7, the angle list 8, and the region 9 for a subsequent step. Here, the outermost left corner $C_L$ of the second object Ob2, which is assigned to the angle of 40°, is examined. From the difference between this angle of 40° and the last azimuth angle $\theta_L$ of 30°, the visible angle of 10° of the second object Ob2 is then calculated and updated in the angle list 8. In addition, the second object Ob2 is deleted from the obscuration list 7. The last azimuth angle $\theta_L$ is updated from 30° to 40°.

Figure 6D:
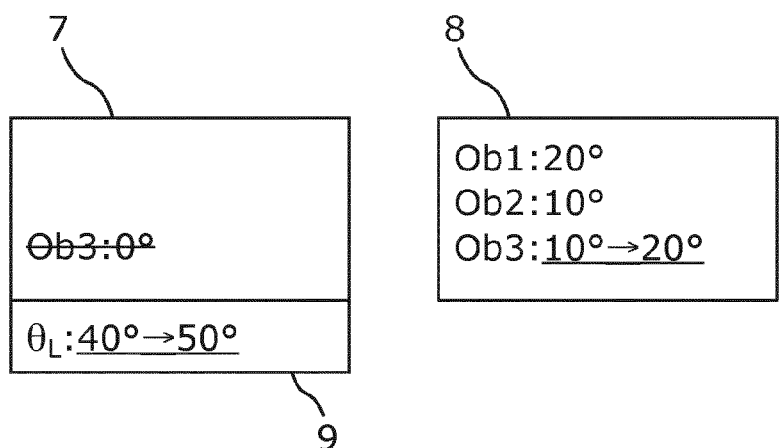

FIG. 6d shows the obscuration list 7, the angle list 8, and the region 9 for a subsequent step. Here, the outermost left corner $C_L$ of the third object Ob3, which is assigned to the angle of 50°, is examined. From the difference between this angle of 50° and the last azimuth angle $\theta_L$ of 40°, the visible angle of 10° of the third object Ob3 is then calculated and updated in the angle list 8. In addition, the third object Ob3 is deleted from the obscuration list 7. The last azimuth angle $\theta_L$ is updated from 40° to 50°, and the method is terminated.

The result of the method is that, of the first object Ob1, 200 in the angle region between 10° and 30° are visible. Consequently, 100% of the first object Ob1 is visible. Of the second object Ob2, 10° in the angle region between 300 and 400 are visible. Consequently, 50% of the second object Ob2 is visible. Of the third object Ob3, 200 in the angle regions from 0° to 10° and from 40° to 50° are visible. Consequently, 40% of the third object is visible.

The method can also be used for vicinity sensors having a capture region of 360°. Such vicinity sensors, which are in the form of radar sensors or of lidar sensors, can be arranged for example on the roof of the vehicle 1. It is possible here to define the angle for example from 0° to 360° or from −180° to 180°. Problems with objects Ob1, Ob2, Ob3 which extend over the defined angle limit from 180° to −180° or from 360° to 0° may occur in the process. In the case of the previously described arrangement of the angles in order in the angle direction, errors may occur here. Therefore, provision is made for objects Ob1, Ob2, Ob3 which extend over the angle limit to be split into two partial objects. The split is effected here at the angle limit. Consequently, a real object Ob1, Ob2, Ob3 is assigned four outer corners overall but the same identifier.

The invention claimed is:

1. A method for capturing objects in a surrounding area of a vehicle, the method comprising:
   receiving sensor data describing the objects in the surrounding area from a vicinity sensor of the vehicle,
   determining corners of the objects, wherein respective corners describe outer boundaries of a respective object,
   determining a relative orientation of the corners in relation to the vicinity sensor,
   arranging the corners in order in a predetermined angle direction,
   checking each of the corners along the angle direction as to whether each of the corners is obscured by another of the objects, based on the relative orientation of the corners in relation to the vicinity sensor, and
   determining regions of the respective objects that are capturable for the vicinity sensor based on the checking of the corners.

2. The method according to claim 1, further comprising:
determining a proportion of the respective objects which is located in a capture region of the vicinity sensor, wherein the capturable regions are determined in dependence on the proportion.

3. The method according to claim 1, further comprising:
determining an obscuration list in which the respective objects are entered in dependence on a relative orientation of their corners in relation to the vicinity sensor, wherein the obscuration list is updated during the checking of the corners along the angle direction.

4. The method according to claim 1, wherein:
for determining the capturable regions of the respective objects, an angle list is determined which describes capturable angle regions of the respective objects, and the angle list is updated during the checking of the corners along the angle direction.

5. The method according to claim 1, wherein the corners of the objects are determined in polar coordinates.

6. The method according to claim 1, further comprising:
determining a probability of existence for the respective objects in dependence on the capturable regions of the respective objects.

7. A computing device for a sensor system of a vehicle, wherein the computing device is configured for carrying out the method according to claim 1.

8. A sensor system for a vehicle, comprising:
the computing device according to claim 7, and
at least one vicinity sensor.

9. A computer product comprising a non-transitory computer readable medium having stored thereon program code which, when executed by a computing device, carries out the method according to claim 1.

* * * * *